No. 892,016.       PATENTED JUNE 30, 1908.
R. P. STARK & C. R. KLINGENSMITH.
TROLLEY WHEEL.
APPLICATION FILED APR. 23, 1907.
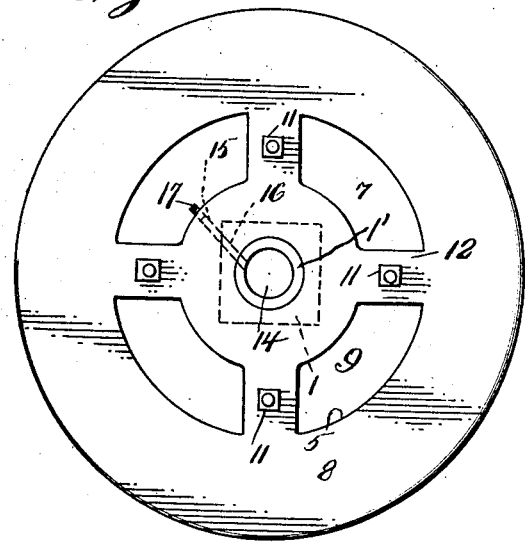
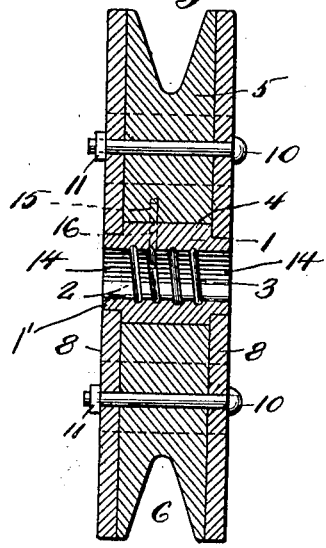
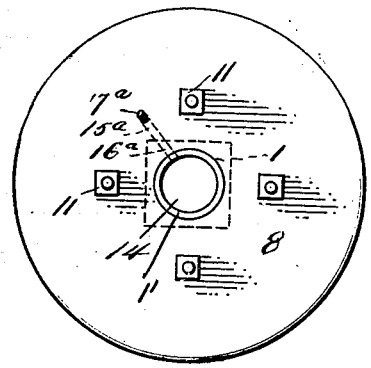
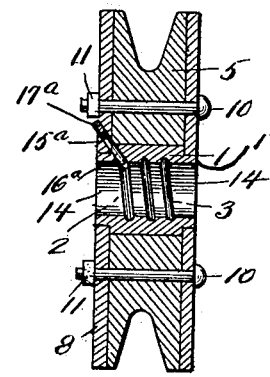
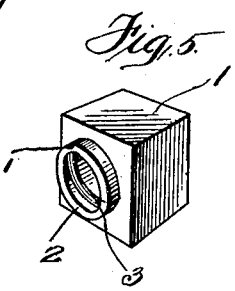
WITNESSES:
Samuel Payne
N. H. Butler
INVENTORS.
R. P. Stark and C. R. Klingensmith.
By H. C. Everitt & Co.
Attorneys

UNITED STATES PATENT OFFICE.

ROBERT P. STARK AND CHARLES R. KLINGENSMITH, OF CREIGHTON, PENNSYLVANIA.

TROLLEY-WHEEL.

No. 892,016.  Specification of Letters Patent.  Patented June 30, 1908.

Application filed April 23, 1907. Serial No. 369,809.

To all whom it may concern:

Be it known that we, ROBERT P. STARK and CHARLES R. KLINGENSMITH, citizens of the United States of America, residing at Creighton, in the county of Allegheny and State of Pennsylvania, have invented certain new and useful Improvements in Trolley-Wheels, of which the following is a specification, reference being had therein to the accompanying drawing.

This invention relates to trolley wheels, and the invention has for its object to provide a novel wheel wherein the bearing bushing can be easily and quickly renewed when the same has become worn, cracked or otherwise injured.

Another object of this invention is to provide a detachable bearing bushing for trolley wheels provided with spirally arranged grooves for conveying a lubricant to the bearing surfaces of a trolley harp spindle, upon which the wheel is journaled.

A further object of this invention is to provide a strong and durable trolley wheel adapted to reduce the expense of maintenance in connection with an electric railway.

With the above and other objects in view, the invention consists in the novel construction, combination and arrangement of parts to be hereinafter more fully described and then specifically pointed out in the appended claims.

Referring to the drawing forming part of this specification, like numerals of reference designate corresponding parts throughout the several views, in which:

Figure 1 is a side elevation of a trolley wheel constructed in accordance with our invention, Fig. 2 is a vertical sectional view of the same, Fig. 3 is a side elevation of a trolley wheel illustrating a slight modification of our invention, Fig. 4 is a vertical sectional view of the same, Fig. 5 is a perspective view of a bearing bushing used in connection with the trolley wheel.

To put our invention into practice, we construct a substantially rectangular bearing bushing 1 having cylindrical ends 1'. The bushing 1 has its bore 2 provided with spiral grooves 3. The bushing is constructed of bronze, or durable metal, capable of withstanding considerable friction without wearing. The bushing 1 is mounted in the rectangular opening 4 of a circular wheel body 5, said body having a peripheral groove 6 to receive a trolley wire. The body 5 is cut away, as at 7, to save material and reduce the weight of the wheel.

To retain the bushing 1 in the wheel body 5, two side plates are provided each of which consists of a centrally-disposed circular portion 7ª from which project a series of arms 12, these arms 12 terminating in the rim portion 8. The central portion 7ª is formed with a circular opening 14 to receive the cylindrical ends 1' of the bushing 1, and when in such position the flattened portion 1ª at each end of the bushing 1 abuts against the inner face of a side plate as clearly shown in Fig. 1. The wheel body 5 and side plates are secured together through the medium of a plurality of headed bolts and nuts 11, the bolts extending through the arms 12 of the side plates, owing to the plates extending over the ends of the bushing 1, said bushing will be prevented from becoming disengaged from the trolley wheel until said plates are removed.

The circular wheel body 5 is provided with a radially disposed port 15 adapted to communicate with a similar port 16 formed in the bushing 1, these ports being employed to convey a lubricant to the spiral grooves 3. The ports are normally closed by a threaded plug 17 mounted in the port 15.

In Figs. 3 and 4 of the drawing, we have illustrated a slight modification of our invention, wherein the cut away portions of the circular wheel body and side plates are dispensed with, said body and plates being made of solid material to provide a more substantial trolley wheel. Since the cut away portions are dispensed with, we find it necessary to provide one of the plates 8 with an angularly disposed port 15ª communicating with a similar port 16ª formed in the bushing 1, said ports being closed by a threaded plug 17ª. These ports serve functionally the same purpose as the ports 15 and 16 previously described.

It will be apparent from the novel construction of our improved trolley wheel that when the bushing becomes worn or injured that it is not necessary to discard the entire wheel, the side plates 8 being removed and a new bushing placed within the circular wheel body 5.

We do not care to confine ourselves to the metal from which the various parts of the trolley wheel are constructed, or to the size or proportion.

Such other changes in the minor details of construction, as are permissible by the appended claims may be resorted to without departing from the spirit and scope of the invention.

What we claim and desire to secure by Letters Patent, is:—

A trolley wheel comprising a rectangular hollow bushing having each end formed with a cylindrical offset, each of said offsets of a diameter as to form on that end of the boss from which the offset projects a wide marginal portion extending entirely around the offset, said bushing having its inner face provided with spiral grooves, a solid wheel body having a centrally-disposed square opening, said body mounted upon said bushing and of a width equal to the rectangular portion of the bushing, whereby the length of the bearing surfaces of the wheel body upon the rectangular portion of the boss, will be the same as the length of said rectangular portion, a pair of side plates of the same diameter as the wheel body, each of said plates embodying a centrally-disposed circular portion provided with a circular opening, whereby said plate can be mounted upon an offset and bear against the marginal portion which surrounds the offset, each of said plates further embodying a circular rim, and arms connecting the rim with the central portion, the inner face of each of said central portions being uninterrupted from the edge of the circular opening to the outer edge of the portion, said circular portions arms and rims bearing directly against the opposite faces of the wheel body thereby preventing lateral movement of the wheel body in either direction, bolts extending through the arms of the plates and said wheel body for connecting the plates and the wheel body together, nuts mounted upon the ends of the bolts, said nuts fixedly securing the wheel body and plates together, said bushing further provided with an inclined port communicating with one of said grooves, and the circular portion of one of said plates provided with an inclined port communicating with the inclined port of the bushing, combined with a plug for closing the outer end of that port which is formed in said circular portion.

In testimony whereof we affix our signatures in the presence of two witnesses.

ROBERT P. STARK.
CHARLES R. KLINGENSMITH.

Witnesses:
MAX H. SROLOVITZ,
C. V. BROOKS.